(12) United States Patent
McGurk et al.

(10) Patent No.: US 12,786,356 B2
(45) Date of Patent: Nov. 3, 2026

US012786356B2

(54) GENERATING DATA FOR SYNCHRONIZING COMMUNICATION

(71) Applicant: Amazon Technologies, Inc., Seattle, WA (US)

(72) Inventors: Peter McGurk, Sudbury, MA (US); Sean Garcen, Hudson, MA (US); Wei Lee, Acton, MA (US); Paul Michael Mitchell, Lynnfield, MA (US); Joshua David Fazekas, Harleysville, PA (US); Sara Jean Woo, Andover, MA (US); Benjamin Brian Pagano, Hudson, MA (US)

(73) Assignee: Amazon Technologies, Inc., Seattle, WA (US)

( * ) Notice: Subject to any disclaimer, the term of this patent is extended or adjusted under 35 U.S.C. 154(b) by 64 days.

(21) Appl. No.: 18/810,181

(22) Filed: Aug. 20, 2024

(65) Prior Publication Data

US 2026/0059076 A1 Feb. 26, 2026

(51) Int. Cl.

| | |
|---|---|
| ***H04N 7/18*** | (2006.01) |
| *B25J 9/16* | (2006.01) |
| *G06V 10/82* | (2022.01) |
| *G06V 20/52* | (2022.01) |

(52) U.S. Cl.

CPC ............ *H04N 7/183* (2013.01); *H04N 7/188* (2013.01); *B25J 9/1697* (2013.01); *G06V 10/82* (2022.01); *G06V 20/52* (2022.01)

(58) Field of Classification Search

CPC .......... H04N 7/18; H04N 7/183; H04N 7/188; G06V 20/52; G06V 10/82

USPC .......................................................... 348/143

See application file for complete search history.

(56) References Cited

U.S. PATENT DOCUMENTS

| | | | | |
|---|---|---|---|---|
| 12,361,237 | B2 * | 7/2025 | Uehara | H04N 9/8205 |
| 12,536,219 | B2 * | 1/2026 | Yi | G06F 16/41 |
| 2022/0188973 | A1 * | 6/2022 | Puttagunta | G06N 3/04 |
| 2025/0259263 | A1 * | 8/2025 | Zundel | G06V 20/52 |
| 2025/0373804 | A1 * | 12/2025 | Sherriff | H04N 19/124 |

* cited by examiner

*Primary Examiner* — Trang U Tran

(74) *Attorney, Agent, or Firm* — Davis Wright Tremaine LLP

(57) ABSTRACT

Systems and methods are disclosed for generating additional data for one or more frames based, at least in part, on re-synchronization of a transceiver that provides the additional data to one or more additional processors. Systems identity an indication of a trigger that is associated with the one or more frames, cause a set of sensors to generate one or more frames in response to the trigger, generate the additional data, and transmit the additional data to the transceiver in advance of providing the one or more frames.

18 Claims, 8 Drawing Sheets

GENERATING DATA FOR SYNCHRONIZING COMMUNICATION

BACKGROUND

Transmitters that provide sensor data to receivers often enter a sleep mode to conserve energy when not transmitting data. When a transmitter enters sleep mode, it may stop transmitting to a receiver, which can cause the transmitter and receiver to become unsynchronized. Upon activation, a transmitter can re-synchronize a link with a receiver, but this introduces additional latency because the resynchronization process takes time. During this resynchronization process, some portions of the sensor data may be lost, ignored, or otherwise corrupted due to the latency or lack of synchronization between the transmitter and receiver. This can result in gaps or errors in a stream of data used by a receiver, which can negatively impact the completeness and timeliness of the sensor information used by a device.

BRIEF DESCRIPTION OF THE DRAWINGS

Various techniques will be described with reference to the drawings, in which.

DETAILED DESCRIPTION

Figure 1:
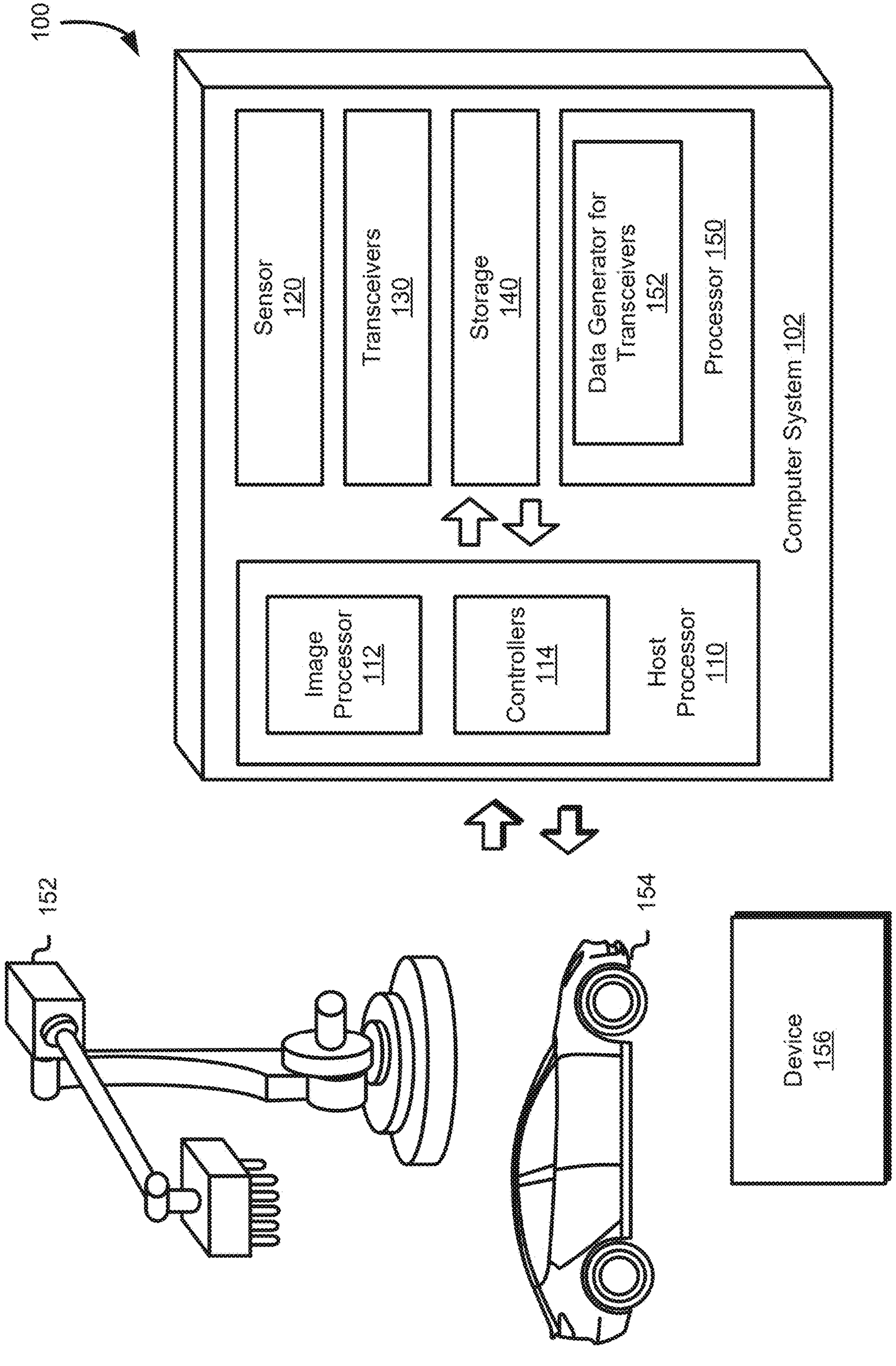
FIG. 1 illustrates a system to control devices using sensor data, according to at least one embodiment.

When a robot is using a camera to capture images (e.g., to move or control objects in the captured images), the camera provides these images to the robot's processor (e.g., central processing unit (CPU)). The camera generates a large amount of data, e.g., gigabytes of pixel information for these images, which is transmitted to the processor through a data link (e.g., a wired connection). To efficiently handle this data, a serializer converts the camera's raw data into a format suitable for efficient transmission, e.g., serial packets of information. This serialized data is then sent over the data link to the deserializer, which converts it back into a usable format for the processor. However, if the data link goes down, such as when the camera or serializer turns off, the communication between the serializer and deserializer is disrupted (e.g., clock synchronization information is lost). Upon reactivation, the serializer and deserializer need to resynchronize, a process that introduces latency. During this resynchronization period, any data transmitted is at risk of being lost, corrupted, or delayed, resulting in incomplete or erroneous information being processed by the processor. This disruption can impact the robot's ability to accurately interpret and respond to its environment, as it may miss critical visual information needed for its tasks while waiting for the serializer and deserializer to resynchronize. This technical problem is not limited to a camera capturing images; rather, any information collected by a sensor and provided to a robot (e.g., its processor) can cause the same or similar problem due to loss of synchronization.

To address this technical problem and provide additional technical advantages, systems and methods are described herein for communicating data (e.g., sensor data) by using artificial or otherwise additional data that causes devices (e.g., serializer and deserializer) to synchronize, wake up, or otherwise coordinate communication before actual data needs to be used by the devices. Specifically, software performed by a processor causes artificial data to be generated such that devices (e.g., a serializer and deserializer) synchronize before real data is used, which prevents loss, corruption, or other delay of such real data. Devices (e.g., robots, autonomous vehicles) can operate by receiving sensor data like frames in real-time, which allows them to make accurate decisions and adjustments during their tasks. For example, in manufacturing, robots may synchronize their actions based on sensor inputs, maintaining high-quality production and reducing errors. Additionally, in autonomous vehicles, cameras can provide image data that helps detect obstacles and navigate safely, ensuring smooth operation. Timely data can enable these devices to function efficiently and safely, with real-time responsiveness enhancing their overall performance.

In some examples, to ensure that sensor data (e.g., images) is timely transmitted to the devices, systems may include a coprocessor (e.g., field-programmable gate array (FPGA)) separate from a host processor (e.g., processors that manage and coordinate all the device's operations, process data, execute commands, and control various peripherals). The processor separate from the host processor may generate synthetic data (e.g., test patterns) such that portions of sensor data aren't neglected during transmission. The coprocessor can be any additional processor that can be a specialized processing unit that assists the host processor by performing specific tasks (e.g., generation of synthetic data). The coprocessor can be standalone chips that are physically separate from the host processor. The coprocessor can have its own dedicated memory and interface. Alternatively, the coprocessor can be integrated into the same chip (e.g., System on Chip (SoC)) as the host processor.

In various examples, the host processor may send the coprocessor an indication of a trigger (e.g., a task performed by the devices that requires sensor data, such as images) or an event that includes the trigger to the coprocessor. The trigger can come from a cloud computing system that connects the devices and sensors (e.g., cameras). In response to the trigger, the coprocessor may send control signals to activate the sensors to generate the sensor data required for the task. In one example, the coprocessor may know how long it will take for the sensor to generate and send the sensor data to the host processor. In another example, the sensor may send indications to the coprocessor that the data is being collected (e.g., light hitting the camera's sensor). The coprocessor can be connected with different sensors that collect different types of data.

In multiple examples, the coprocessor may also generate synthetic data that is smaller in size than the sensor data to be sent to the host processor. For example, the synthetic data can have fewer than 50 lines, while the actual sensor data can have more than 10,000 lines. In another example, the synthetic data can have a smaller number of pixels compared to the sensor data. The length of the synthetic data can be based on the amount of time it needs for the transmitter to wake up, the amount of time for a serializer and deserializer to synchronize, or other amounts of time for a transmitter and receiver to coordinate communication of information such that when the first bit of actual data arrives, the processor is ready to use it and it is not corrupted or delayed.

In other examples, the host processor may indicate the amount of time in a configuration file. The coprocessor can generate a properly formatted packet based on the synthetic data and send the packet to a transmitter (e.g., serializer) to wake up the transmitter. While the packet activates the transmitter (e.g., resynchronizing the link between the transmitter and the receiver based on the packet), the coprocessor receives the sensor data and uses a multiplexer to switch channels such that the sensor data can be sent instead of the synthetic data. The coprocessor sends a separate packet that includes the sensor data. Once the transmitter receives the packet, it can send the sensor data to the receiver, which then forwards the data to the host processor. In several examples, the host processor can use sensor data that is received in time to perform various operations related to the devices.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) minimizing (e.g., eliminating) data loss during the wake-up, synchronization, or communication process, (2) increased resource (e.g., energy, processing power) efficiency caused by a complete and accurate data stream, and (3) efficient communication between devices caused by a complete and accurate data stream. For example, in addition to enabling a transmitter and receiver to resynchronize, the disclosed technology can also cause a host processor of a robot to trigger the generation of artificial data at a specific time and cause the activation of a sensor at a specific time (e.g., starting to capture a video) such that the artificial data, followed by the reception of actual data, is received at a particular time for a particular task, ensuring that an image is captured at a precise time.

FIG. 1 illustrates system 100 to control devices using sensor data, according to at least one embodiment. System 100 may include computer system 102 and one or more devices such as robotic arm 152, automobile 154, and device 156. Computer system 102 may include host processor 110, sensor 120, transceivers 130, storage 140, and processor 150. Computer system 102 may refer to a cloud computing system that connects sensors and robots to process and analyze vast amounts of data collected from various sensors in real-time. This data may then be transmitted to the cloud, where it is stored, processed, and analyzed using advanced algorithms and machine learning techniques. The cloud system can provide insights and actionable intelligence, which are sent back to the robots, enabling them to make informed decisions and perform tasks more efficiently. The cloud computing system may allow for scalability, as additional sensors and robots can be integrated into the system.

In various examples, host processor 100 can include one or more processors that manages and coordinates various devices, such as robots, by processing data and executing commands to ensure efficient and synchronized operation across multiple applications. Host processor 110 may include one or more of central processing units (CPU), graphics processing units (GPU), accelerated processing units (APU), field programmable gate arrays (FPGA), Application-specific integrated circuit (ASIC), digital signal processors (DSP), microcontrollers (MCU), neural processing units (NPU), vision processing unit (VPU), etc.

In some examples, host processor 110 may include image processor 112 and controllers 114. In various examples, as used in any implementation described herein, unless otherwise clear from context or stated explicitly to the contrary, terms such as "module" and nominalized verbs (e.g., image processor 112, controllers 114, data generator for transceivers 152.) illustrated in at least FIG. 1 each refers to any combination of software logic, hardware logic, and/or circuitry configured to provide specific functionality.

Terms such as "software" described herein may include one or more of operating systems, device drivers, application software, database software, graphics software (e.g., Radeon, Intel Graphics), web browsers, development software (e.g., integrated development environments, code editors, compilers, interpreters), network software (e.g., Intel PROset, Intel Advanced Network Services), simulation software, real-time operating systems (RTOS), artificial intelligence software (e.g., Scikit-learn, TensorFlow, PyTorch, Accord.NET, Apache Machout), robotics software (Robotics Benchmarks for Learning (ROBEL), MS AirSi, Apollo Baidu, ROSbot 2.0, Poppy Project), firmware (e.g., BIOS/UEFI, router, smartphone, consumer electronics, embedded systems, printer, solid state drive (SSD)), application programming interface (API), containerized software (e.g., Nginx, Apache HTTP Server, MySQL, PostgreSQL, Redis, Memcached, Node.js, Elasticsearch, Gitlab, Jenkins, WordPress), container orchestration platform (e.g., Kubernetes, Docker Swarm, Apache Mesos, Nomad, Microsoft Azure Kubernetes Service, Google Kubernetes Engine, Red Hat OpenShift, Rancher) and any other implementation embodied as a software package, code and/or instruction set.

Additionally, terms such as "hardware" described herein may include, in addition to host processor 110 and processor 150, one or more of hardwired circuitry, programmable circuitry, state machine circuitry, fixed function circuitry, execution unit circuitry, integrated circuit (IC), system on-chip (SoC), and/or firmware that stores instructions executed by programmable circuitry.

In at least one embodiment, image processor 112 may refer to a software module that generates and preprocesses (e.g., denoises, downsamples, upsamples, or otherwise modifies) images. Image processor 112 may modify images captured by various sensors (e.g., sensor 120). Modification of images may include, for example, resizing, cropping, normalization (e.g., scaling intensity values), augmentation (e.g., rotation, flipping, zooming, shifting, other affine transforms), redistribution of intensity values (e.g., histogram equalization), denoising, enhancement (e.g., adjusting brightness, contrast, sharpness), color space conversion, filtering (e.g., Laplacian, Sobel, Gaussian blur), image alignment, scaling (e.g., deep learning super-sampling (DLSS), Xe super-sampling (XeSS), AMD FidelityFX Super Resolution (FSR)), and/or anti-aliasing (e.g., multi-sample anti-aliasing (MSAA), fast approximate anti-aliasing (FXAA), temporal anti-aliasing (TAA), super-sampling anti-aliasing (SSAA), conservative morphological anti-aliasing (CMAA)).

In various examples, image processor 112 may generate or modify neural network training data that can be used by one or more neural networks. For example, image processor 232 may generate labels for supervised learning or generate partially labeled data for semi-supervised learning of neural networks. The labeled data and partially labeled data can be used by controllers 114.

In at least one embodiment, controllers 114 may refer to a module that generates control signals or other information that causes various devices (e.g., robotic arm 152, automobiles 154, device 156) to perform operations (e.g., move, pick, etc.) as intended. For example, controllers 114 may determine which location to place the objects using the devices. Additionally, robot controller 238 may receive other sensor data generated by sensor 120 to make the determination.

Based on the determination, controllers 114 may generate control signals to cause the devices to perform operations (e.g., pick up one or more objects and place the one or more objects into one or more containers, move containers to a different location inside or outside of a warehouse). Controllers 114 can use either wireless or wired communication to communicate (e.g., transmit signals) to robot and/or the autonomous robots that move containers. Wireless communication may include radio frequency (RF) communication, Wi-Fi, Bluetooth, infrared communication, near field communication, cellular communication, satellite communication, long range (LoRA), etc.

Controllers 114 may dynamically assign tasks based on the devices'proximity, capabilities, and current workload. Controllers 114 may perform a scheduling algorithm that optimizes task sequences to minimize completion time and maximize overall efficiency. Controllers 114 may anticipate changes in operational demands and adjust task allocations accordingly. To assign tasks, controllers 114 decompose complex tasks into manageable sub-tasks. Then, controllers 114 may plan the sequence of actions required to accomplish each sub-task, considering factors such as efficiency, safety, and the capabilities of each device. For each sub-task, controllers 114 may determine the optimal path and movements required. Path planning may include calculating the most efficient routes for the devices to take, avoiding obstacles, and ensuring that the devices do not collide with each other. Motion control may include the precise control of each devices'motors and actuators to follow the planned path and execute the required movement. Additionally, controllers 114 may generate control signals by translating the planned actions and movements. These signals may include typically electrical or digital commands that directly interface with the devices'drive systems (motors, actuators) and other functional components (grippers, sensors). Controllers 114 may send control signals to the devices through wired or wireless communication protocols. The choice of communication medium depends on factors such as the operational environment, the required response time, and the distance between the controller and the devices.

Additionally, controllers 114 may include a monitoring interface that provides real-time feedback on the status and position of each device. As a result, this allows operators of, for example, a warehouse to manually override the system to redirect devices or adjust task priorities in response to emergent situations, ensuring flexibility and responsiveness in dynamic environments. Controllers 114 may coordinate various sensors (e.g., sensor 120) to implement safety protocols to prevent collisions and ensure the safety of both devices and human personnel. In particular, controllers 114 may continuously scan the operational environment to identify potential hazards and autonomously adjust the devices'paths to avoid them. Controllers 114 may utilize historical performance data to identify patterns and inefficiencies.

In at least one embodiment, controllers 114 may use one or more neural networks to perform such operations using sensor data (e.g., images) that are received from image processor 112, sensor 120, transceivers, and processor 150. Communication of sensor data using processor 150 is further described herein. To perform such operations, the one or more neural networks may perform, for example, images classification, object detection, image segmentation (e.g., semantic segmentation, instance segmentation), image generation, image restoration and enhancement, style transfer, facial recognition, pose estimation, autonomous driving, augmented reality, virtual reality, 3D reconstructions, label identification, object grasping, path planning and navigation, simultaneous localization and mapping, visual serving, autonomous drone flight, assembly line automation, inspection and quality control, warehouse management, bin picking, robotic surgery, etc.

In some examples, the one or more neural networks may include, for example, convolutional neural networks (CNN) (e.g., U-Net, You Only Look Once (YOLO)), recurrent neural networks (RNN), long short-term memory networks (LSTM), generative adversarial network (GAN), variational autoencoders (VAE), transformer neural networks, residual networks, graph neural networks (GNN), deep q-networks (DQN), etc.

In various examples, the one or more neural networks can be trained using supervised learning, semi-supervised learning, self-supervised learning, reinforcement learning, transfer learning, few-shot learning, federated learning, etc. The one or more neural networks can be trained using optimization algorithms such as, stochastic gradient descent (SGD), batch gradient descent, mini-batch gradient descent, adaptive moment estimation (Adam), root mean square propagation (RMSProp), etc. The one or more neural networks can be trained using regularization techniques such as, L1 regularization, L2 regularization, dropout, early stopping, data augmentation, batch normalization, layer normalization, weight decay, etc. Controllers 114 may use one or more hardware accelerators (e.g., GPU, ASIC, FPGA, APU, NPU) for neural network training and inferencing.

In at least one embodiment, to perform various functions by image processor 112 and/or controllers 114, host processor 110 may execute software (e.g., applications). While performing the software, host processor 110 may communicate triggers or events that include the triggers to sensor 120, transceivers 130, and/or processor 150, which indicate that sensor data (e.g., one or more images) is needed for the software to perform the various functions to cause devices, such as robotic arm 152, automobile 154, device 156 to perform certain steps.

In some examples, sensor 120 can be a device that detects and measures physical properties from an environment and converts this information into data that can be interpreted by other devices (e.g., robotic arm 152, automobile 154, device 156). Sensor 120 may include one or more of proximity sensors (e.g., infrared (IR) sensors, ultrasonic sensors, capacitive sensors, inductive sensors), vision sensors (e.g., cameras (RGB, depth, thermal), light detection and ranging (LiDAR)), position and motion sensors (e.g., global positioning system (GPS), inertial measurement unit (IMU), accelerometers, gyroscopes, magnetometers, encoders (rotary and linear), touch and force sensors (e.g., tactile sensors, torque sensors, pressure sensors), environmental sensors (e.g., temperature sensors, humidity sensors, gas sensors, light sensors, sound sensors), health monitoring sensors (e.g., heart rate monitors, electroencephalogram (EEG) sensors, electromyography (EMG) sensors, etc.).

In at least one embodiment, sensor 120 may include two or more cameras that can be located in different places within an area (e.g., work cell) to capture objects from different perspectives. In some examples, some or all of the cameras may move around the area to capture objects from different perspectives. The cameras may include hardware devices such as digital cameras (e.g., Digital Single-Lens Reflex, mirrorless cameras), smartphones, tablets, webcams, action cameras, Closed-Circuit Television cameras, drones, ultrasound machines, and/or machine vision cameras. Host processor 110 and processor 150 can synchronize the two or more cameras to ensure that the images are transmitted on time.

In at least one embodiment, sensor 120 receives one or more triggers and/or one or more control signals from host processor 110 and/or processor 150, where the one or more triggers and/or one or more control signals cause sensor 120 to generate sensor data. For example, sensor 120 generates a stream of frames to be used by host processor 110. Sensor 120 may indicate when the stream of frames are to be generated to processor 150. After generating the stream of frames, sensor 120 may transmit the stream of frames to processor 150 such that processor 150 can transmit to transceivers 130.

In multiple examples, transceivers 130 can be a single unit of a transmitter and a receiver. Alternatively, transceivers 130 can be multiple units of one or more transmitters and one or more receivers. Transceivers 130 can send and receive signals or data over one or more communication channels. Transceivers 130 can switch between transmitting and receiving modes as needed.

In at least one embodiment, transceivers 130 can be in low-power sleep mode when there is no data to be transmitted or received, thereby consuming minimal power and preserving battery life. Transceivers 130 comprise a mechanism to detect a wake-up trigger from host processor 110 and/or processor 150. The wake-up trigger can be a predefined signal, a change in signal strength, a scheduled timer, an external event, etc.

After receiving a trigger, transceivers 130 can perform a re-synchronization process to re-establish the communication link. The process may include aligning with the communication protocol, re-establishing handshakes, and synchronizing data streams. Transceivers 130 may be configured to minimize latency during the transition from sleep to active mode by performing a quick re-synchronization process.

In some examples, transceivers 130 may include one or more serializers. A serializer may refer to a device or software component that converts parallel data, which consists of multiple data bits transmitted simultaneously, into serial data, where bits can be transmitted sequentially one at time. The one or more serializers may include, for example, universal asynchronous receiver-transmitter (UART), ethernet transceiver (PHY), PCI express (PCIe) serializer, FPGA serializer, Camera Serial Interface (CSI), Gigabit Multimedia Serial Link (GMSL) serializer, GMSL2 serializer, flat panel display link (FPD-Link) serializer, mobile industry processor interface camera serial interface (MIPI CIS-2), low-voltage differential signaling (LVDS), V-by-One HS serializer, automotive pixel link (APIX), etc.

In various examples, transceivers 130 may include one or more deserializers. A deserializer may refer to a device or software component that converts serial data, which consists of data bits transmitted sequentially one at a time, back into parallel data, where multiple bits are processed simultaneously. Upon receiving the serial data, the deserializer reconstructs the original parallel data stream, enabling host processor 110 to efficiently process the information. The one or more deserializers may include, for example, GMSL deserializer, FPD-Link deserializer, LVDS deserializer, V-by-One HS deserializer, FPGA deserializer, PCIe deserializer, MIPI D-PHY, etc.

In at least one embodiment, serializers and deserializers may communicate using established protocols to convert data between formats suitable for transmission or storage and formats suitable for processing. This communication may require synchronization to ensure that the data being serialized on one end can be correctly deserialized on the other. If synchronization is lost, for instance, if one end goes down, the data flow can be disrupted, causing the other end to fail in interpreting the incoming data correctly. This loss of synchronization may result in corrupted data, incomplete transmissions, or system crashes.

In several examples, storage 140 may refer to one or more devices to store data. Storage 140 may include one or more random access memory (RAM), read-only memory (ROM), flash memory (e.g., USB flash drives, SSD, memory cards), cache memory, hard disk drives (HDDs), virtual memory, graphics memory, optical discs, network attached storage (NAS), cloud storage, tape storage, etc. Storage 140 may store data captured from sensor 120, where the stored data might be subject to modification by image processor 112. Storage 140 may also store modified images generated by image processor 112.

In various examples, processor 150 can be a coprocessor that handles communication between host processor 110 and sensor 120. Processor 150 may include one or more of central processing units (CPU), graphics processing units (GPU), accelerated processing units (APU), field programmable gate arrays (FPGA), Application-specific integrated circuit (ASIC), digital signal processors (DSP), microcontrollers (MCU), neural processing units (NPU), etc. Processor 150 may include data generator for transceivers 152.

In at least one embodiment, processor 150 may handle communication between sensor 120 and transceivers 130 such that sensor data generated from sensor 120 can be communicated to host processor 110. Processor 150 may include data generator for transceivers 152. Data generator for transceivers 152 may refer to a module that generates artificial data. This data can be transmitted while the transceivers resynchronize their link after receiving a trigger, thereby preventing data loss during the resynchronization process.

Specifically, processor 150 may receive a trigger indicating that a host processor needs sensor data to generate control signals. Processor 150 may send indications of the trigger or control signals to sensor 120 and transceivers 130. Processor 150 then can use data generator for transceivers 152 to generate synthetic data. Different examples of the synthetic data are further described in conjunction with FIG. 2. Data generator for transceivers 152 may depend on various factors. For example, data generator for transceivers 152 may generate the synthetic data based on configuration information received from host processor 110, where the configuration information may indicate how long it will take for transceivers 130 to resynchronize the link if they received a trigger. Additionally, data generator for transceivers 152 may generate the synthetic data when the sensor data is generated by sensor 120. Sensor 120 may communicate indications of when the sensor data is to be transmitted to processor 150. After processor 150 receives the sensor data, processor 150 may use a multiplexer to route the sensor data to be transmitted to transceivers instead of the synthetic data.

As a result, sensor 120 or processor 150 do not have to transmit duplicate data due to transceivers 130 not being able to process first portions of the sensor data due to reactivation of the link between components of transceivers 130.

In at least one embodiment, device 156 may include industrial robots (e.g., delta robots, cartesian robots), service robots (e.g., domestic robots, medical robots), mobile robots (e.g., autonomous mobile robots, drones), humanoid robots (e.g., bipedal robots, robotic exoskeletons), rovers, agricultural robots (e.g., planting and harvesting robots), etc.

Figure 2:
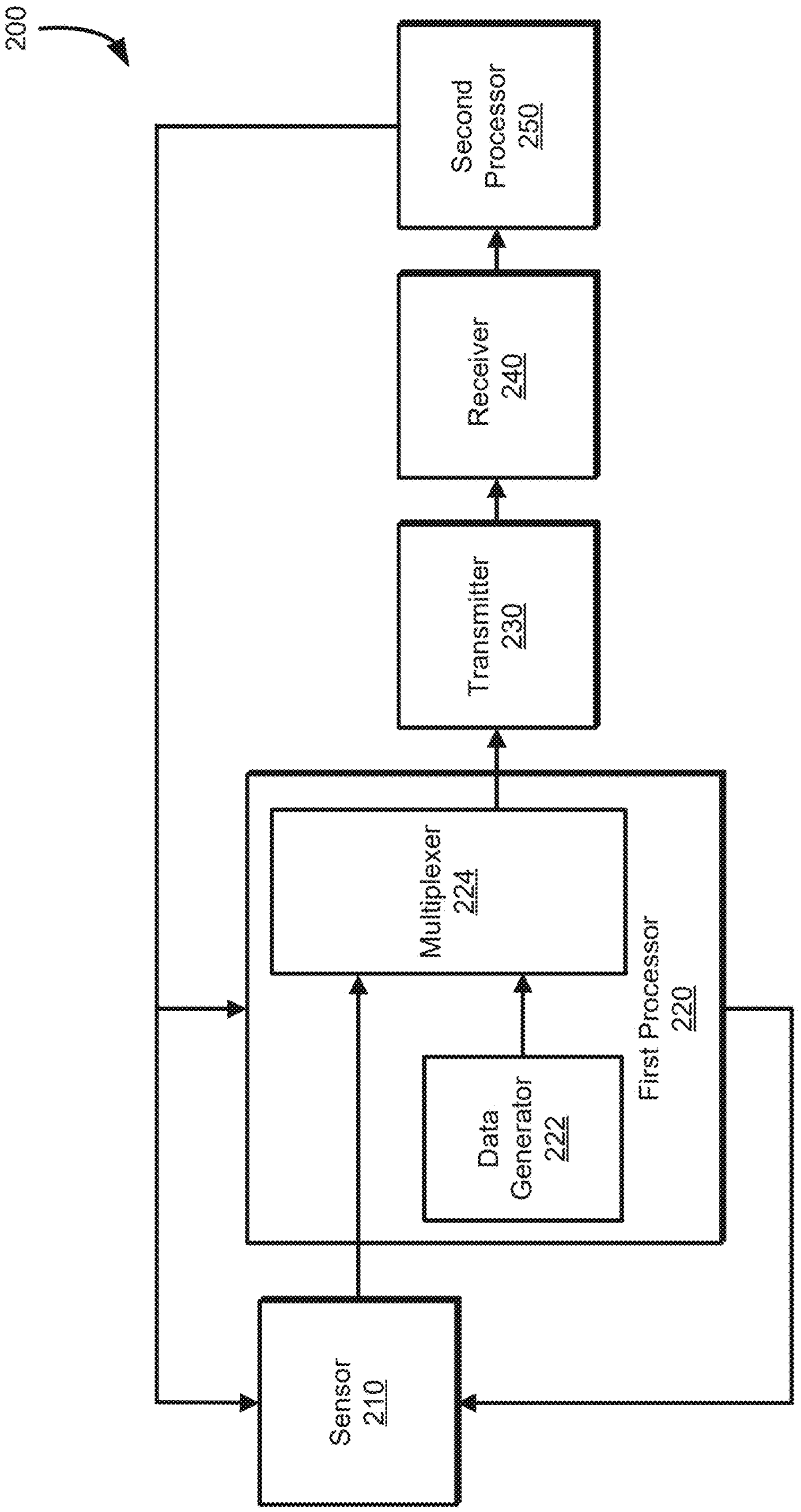
FIG. 2 illustrates a system to generate data for sensor data communication, according to at least one embodiment.

FIG. 2 illustrates system 200 to generate data for sensor data communication, according to at least one embodiment. System 200 may include sensor 210, first processor 220, transmitter 230, receiver 240, and second processor 250. Second processor 250 can be a host processor of one or more devices (e.g., robotic arm 152, automobile 154, device 156 illustrated in FIG. 1). Second processor 250 may include host processor 110 illustrated in FIG. 1.

In at least one embodiment, second processor 250 can be one or more processors that controls and coordinates various devices by processing data, executing commands, and managing communication to ensure efficient and synchronized operations across a wide range of applications, from robotics to automation and beyond. While performing those operations across the wide range of applications, second processor 250 may need sensor data (e.g., stream of images). After identifying or receiving one or more triggers associated with those applications, second processor 250 may indicate the triggers to sensor 210 and/or first processor 220.

In at least one embodiment, the one or more triggers or any other events that active the trigger may include request from second processor 250 to obtain images in an exact times to control the various devices and sensors in time, especially when the devices move fast. The one or more triggers may further include the devices requiring taking one or more pictures such that the devices can decide to move. The one or more triggers may further include the devices detecting audio and vibration data from a sensor and using this information to precisely maneuver the devices. The one or more triggers may include a robot that requires image data could be the detection of a specific color or shape in its environment. Specifically, if a robot is configured to sort objects based on color, the appearance of a red object in its camera's field of view could serve as the triggering event. This event may prompt the robot to capture an image, analyze the color, and then execute the appropriate sorting action based on the detected color.

In various examples, first processor 220 can be a coprocessor (of second processor 250) that handles communication between sensor 210 and second processor 250. First processor 220 may include processor 150 illustrated in FIG. 1 and/or processor 310 illustrated in FIG. 3. First processor 220 may include data generator 222 and multiplexer 224. First processor 220 may use data generator 222 to generate fabricated data.

The fabricated data may include one or more test patterns. Test pattern may refer to a predefined sequence or image usable to verify the quality, accuracy, and performance of the transmission system. Various test patterns may include, for example, gradient test pattern, ultra high definition test pattern, grayscale test pattern, color bar test pattern, resolution test pattern, focus test pattern, linearity test pattern, checkerboard test pattern, multiburst test pattern, geometry test pattern, etc. Test patterns can be used for establishing, optimizing, and maintaining data links in communication systems. Specifically, the test patterns can be used during link initialization to synchronize the transmitter and receiver, ensuring a stable connection before data transmission begins.

In at least one embodiment, link, data link, or any other connection between components (e.g., transmitter 230, receiver 240) may refer to communication pathway established for the transmission of data between two components. For example, transmitter 230 may convert parallel data from a source into a serialized data stream for efficient transmission over a single or multiple high-speed channels. Receiver 240, on the receiving end, may reverse this process, converting the serialized data stream back into parallel data for use by the destination device.

In some examples, the fabricated data can be any kind of artificial data that is shorter than the actual sensor data is to be sent to second processor 250 and as long as it can be part of a packet to be sent to transmitter 230. For example, the data may include 3 to 5 lines while the actual sensor data includes 10,000 lines. Additionally, the data may include, for example, null data, void data, missing data, blank data, etc. First processor 220 may determine the length of the data based on configuration information sent by second processor 250. The configuration information may depend on the type of transmitter 230. For example, if it takes longer time to wake up transmitter 230, the length of the data is longer. In another example, if it takes shorter time to wake up transmitter 230, the length of the data is shorter. First processor 220 may determine the length of the data based on the length of the sensor data to be received from sensor 210. The fabricated data may include one or more random pixels. The fabricated data may include random noise with known frame timing.

As soon as first processor 220 receives an indication of the one or more triggers, first processor 220 may send one or more control signals to sensor 210 such that sensor 210 generates the sensor data, and generates synthetic data using data generator 222 to send the synthetic data to the transmitter 230 via multiplexer 224. In response, sensor 210 may indicate to first processor 220 that sensor 210 started capturing sensor data (e.g., exposure of light). While sensor 210 collects the sensor data, first processor 220 may transmit the synthetic data to transmitter 230 to wake up transmitter 230 and use multiplexer 224 to reroute (e.g., switch from synthetic data channel to sensor data channel) the sensor data instead of the synthetic data when first processor 220 receives the sensor data from sensor 210. Also, first processor 220 may transmit the synthetic data to synchronize (e.g., get clock information, follow protocol, etc.) the link between transmitter 230 and receiver 240. The resynchronization process upon a trigger may further include transmitting a specific synchronization pattern or training sequence to the receiver 240. This pattern allows receiver 240 to detect the presence of the signal of transmitter 230 and realign its internal clock to match the timing of transmitter 230. Also, receiver 240 adjusts its parameters to lock onto the serializer's data stream. The synthetic data is sent while the resynchronization process is performed.

In some examples, first processor 220 may have information on how long it will take to generate the sensor data for different types of sensors. In some examples, sensor 210 can be a device that detects and measures physical properties from an environment and converts this information into data that can be interpreted by other devices (e.g., robotic arm 152, automobile 154, device 156). Sensor 210 may include sensor 120 illustrated in FIG. 1.

In multiple examples, transmitter 230 can be a device that converts various forms of data into signals that can be transmitted over different mediums to receivers to facilitate communication across diverse applications. Transmitter 230 may include transceivers 130 illustrated in FIG. 1. Transmitter 230 is deactivated when no sensor data needs to be communicated to receiver 240. After receiving an actual traffic that includes one or more properly formatted packets, transmitter 230 may automatically synchronize to the one or more packets. The one or more packets may include data generated from data generator 222. After the synchronization process is complete, transmitter 230 may receive another one or more packets that include sensor data generated from sensor 210 and is able to transmit the sensor data to receiver 240.

In several examples, receiver 240 can be a device that converts incoming signals back into usable data formats to enable reception and interpretation of information across a wide range of applications. Receiver 240 may include transceivers 130 illustrated in FIG. 1. Receiver 240 may transmit sensor data to second processor 250 such that second processor 250 may use the sensor data to perform one or more operations associated with one or more devices (e.g., robots).

By preventing delay caused by re-transmitting sensor data as a result of some of the sensor data being ignored during wake up of transmitter 230, second processor 250 can receive sensor data in the exact moment. As a result, second processor 250 may ensure better coordination between image capture and processing, leading to more efficient and accurate actions. Also, second processor 250 may perform timely analysis and responses based on the images, crucial for applications like autonomous driving and real-time monitoring. Second processor 250 can better synchronize a plurality of sensors including sensor 210 as a result of receiving sensor data in the exact moment. Also, second processor 250 may execute movements and tasks with an extremely high degree of accuracy and repeatability.

In at least one embodiment, a robot (e.g., robotic arm 152, automobile 154, device 156 illustrated in FIG. 1) may utilize the synthetic data generation described herein to capture images at precise times and positions, providing a significant advantage over other systems. The robot can accurately determine when it triggers the synthetic data, the camera, and the associated time intervals. Consequently, this process can function as an effective timestamping mechanism. For example, a drone can capture high-resolution images of crops at exact intervals and specified positions along its flight path. This precision can enable the drone to consistently monitor crop health, detect early signs of disease, and assess growth patterns. Since the drone knows the exact moments it triggers the camera and records the corresponding time stamps, it can correlate the captured images with specific locations and times.

Figure 3:
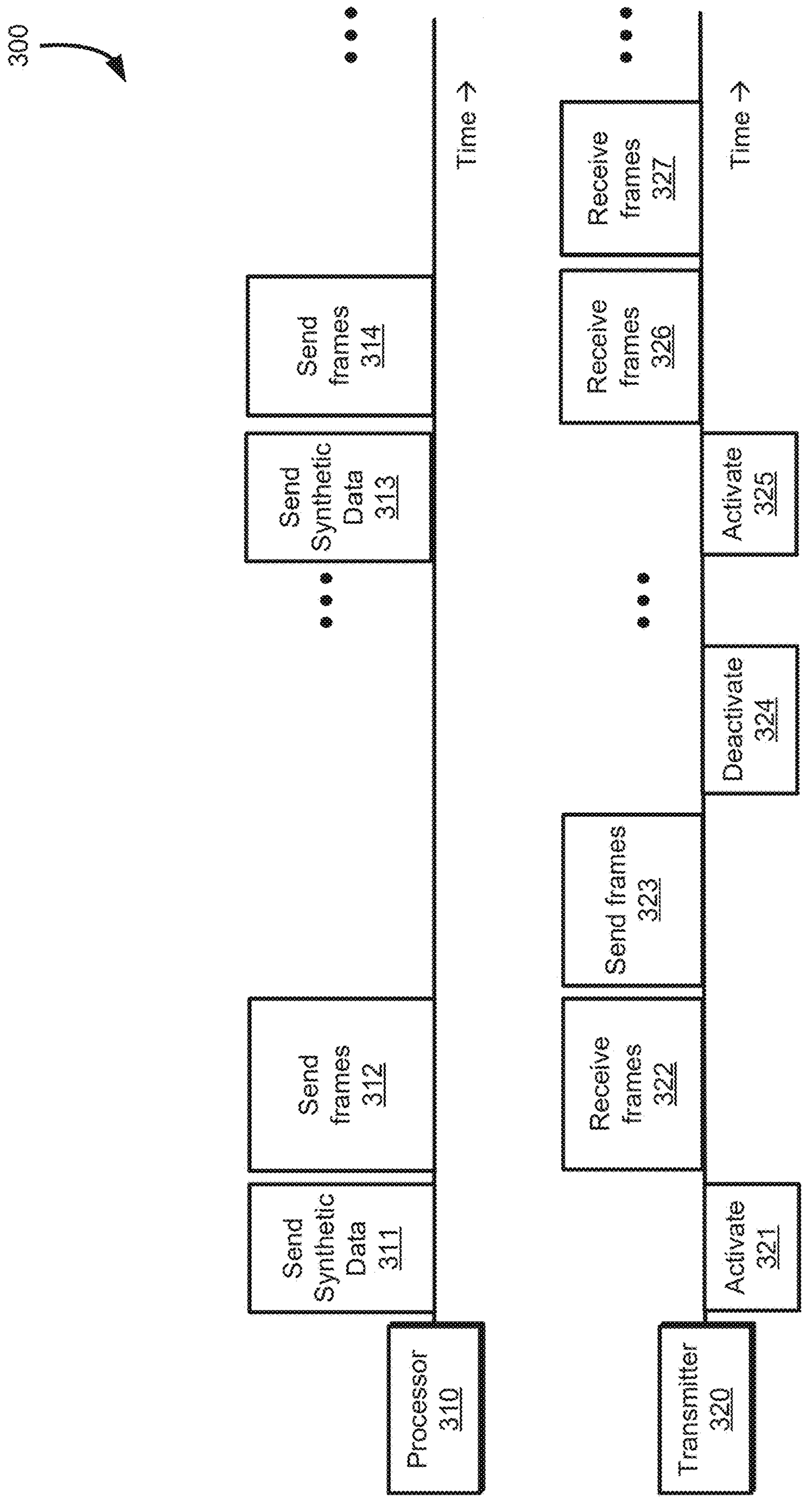
FIG. 3 illustrates a schematic diagram of sensor data communication, according to at least one embodiment.

FIG. 3 illustrates an example diagram 300 of sensor data communication, according to at least one embodiment. Diagram 300 may include one or more operations performed by processor 310 and transmitter 320.

In various examples, processor 310 can be a coprocessor of a host processor (e.g., host processor 110 illustrated in FIG. 1, second processor 250 illustrated in FIG. 2) for a device (e.g., robotic arm 152, automobile 154, device 156 illustrated in FIG. 1) that handles communication between the host processor and one or more sensors (e.g., sensor 120 illustrated in FIG. 1, sensor 210 illustrated in FIG. 2). Processor 310 may include processor 150 illustrated in FIG. 1. Processor 310 may include first processor 220 illustrated in FIG. 2.

In some examples, transmitter 320 can be a device that converts different forms of data into signals that can be efficiently transmitted over various mediums to receivers (e.g., transceivers 130 illustrated in FIG. 1, receiver 240 illustrated in FIG. 2), enabling communication across multiple applications. Transmitter 320 may include transceivers 130 illustrated in FIG. 1. Processor 310 may include transmitter 230 illustrated in FIG. 2.

In multiple examples, processor 310 may send synthetic data 311 to transmitter 320 as a result of receiving a trigger from one or more host processors (e.g., host processor 110 illustrated in FIG. 1, second processor 250 illustrated in FIG. 2). Processor 310 may send the synthetic data in a properly formatted packet. The synthetic data may include random pixels and/or test patterns. Different types of synthetic data are described in conjunction with FIG. 2. In response, transmitter 320 activates 321 by resynchronizing the link between transmitter 320 and one or more receivers (e.g., receiver 240 illustrated in FIG. 2). As a result of receiving sensor data, such as a stream of frames, processor 310 may send frames 312 to transmitter 320. Frames can be part of a video footage captured by a moving robot. At this point, transmitter 320 has completed the resynchronization and can be able to receive the sensor data. After receiving the sensor data 322, transmitter 320 can send the sensor data to the one or more receivers 323 and then deactivate 324 if there is no additional sensor data to be sent.

In at least one embodiment, the process of processor 310 sending synthetic data 311 and frames 312 and transmitter 320 activating 321, receiving frames 322, and sending frames 323 to the receiver can be periodically or aperiodically repeated using triggers. For example, every time a robot wants to use its camera to perform a task, this process can be trigger, and then the camera can be shutoff after the task is completed, and then it starts all over again.

Additionally, as part of repeating the process, processor 310 may send additional synthetic data 313 to transmitter 320 as a result of receiving a trigger from one or more host processors (e.g., host processor 110 illustrated in FIG. 1, second processor 250 illustrated in FIG. 2). Processor 310 may send the synthetic data in a properly formatted packet. In response, transmitter 320 may activate 325 by resynchronizing the link between transmitter 320 and one or more receivers (e.g., receiver 240 illustrated in FIG. 2). As a result of receiving additional sensor data, processor 310 may send frames 314 to transmitter 320. At this point, transmitter 320 has completed the resynchronization and can receive the sensor data. After receiving the additional sensor data 326, transmitter 320 can send the sensor data to the one or more receivers 326 and then deactivate 327 if there is no additional sensor data to be sent.

Figure 4:
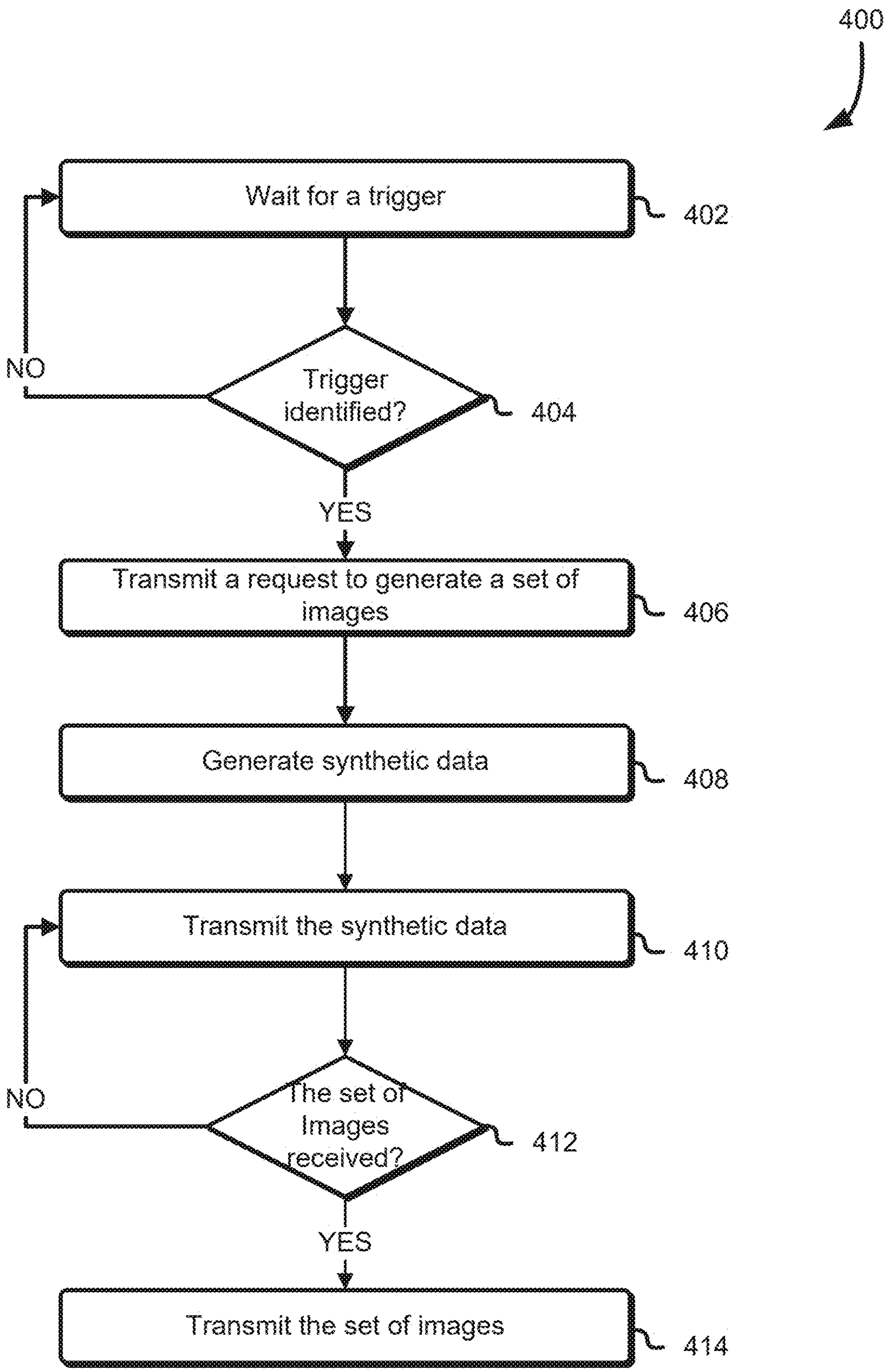
FIG. 4 illustrates a process to generate data for sensor data communication, according to at least one embodiment.

FIG. 4 illustrates an example process to generate data for sensor data communication, according to at least one embodiment. Although process 400 is depicted as a series of steps or operations, it will be appreciated that at least one embodiment of process 400 includes altered or reordered steps or operations, or omits certain steps or operations, except where explicitly noted or logically required, such as when an output of one step or operation is used as input for another. One or more entities described in conjunction with FIGS. 1-3 and 7-8, singly or in any combination, can perform each block of process 400. For example, the one or more entities may include computer system 102, host processor 110, image processor 112, controllers 114, sensor 120, transceivers 130, storage 140, processor 150, data generator for transceivers 152, robotic arm 152, automobile 154, and/or device 156 illustrated in FIG. 1. In some examples, the one or more entities may include sensor 210, first processor 220, data generator 222, transmitter 230, receiver 240, and/or second processor 250 illustrated in FIG. 2. In other example, the one or more entities may include processor 310 and/or transmitter 320 illustrated in FIG. 3. The one or more entities may further include, for example, one or more of hardware and/or software described in conjunction with FIG. 1.

Various functions can be carried out by a processor executing instructions stored in memory (e.g., computer readable, machine readable) to perform process 400. For example, the instructions may include a computer program persistently stored on magnetic, optical, or flash media. Also, process 400 may be implemented as computer-usable instructions (e.g., macro instruction, micro-instruction) stored on computer storage media or provided by a standalone application, a service or hosted service (standalone or in combination with another hosted service).

Figure 7:
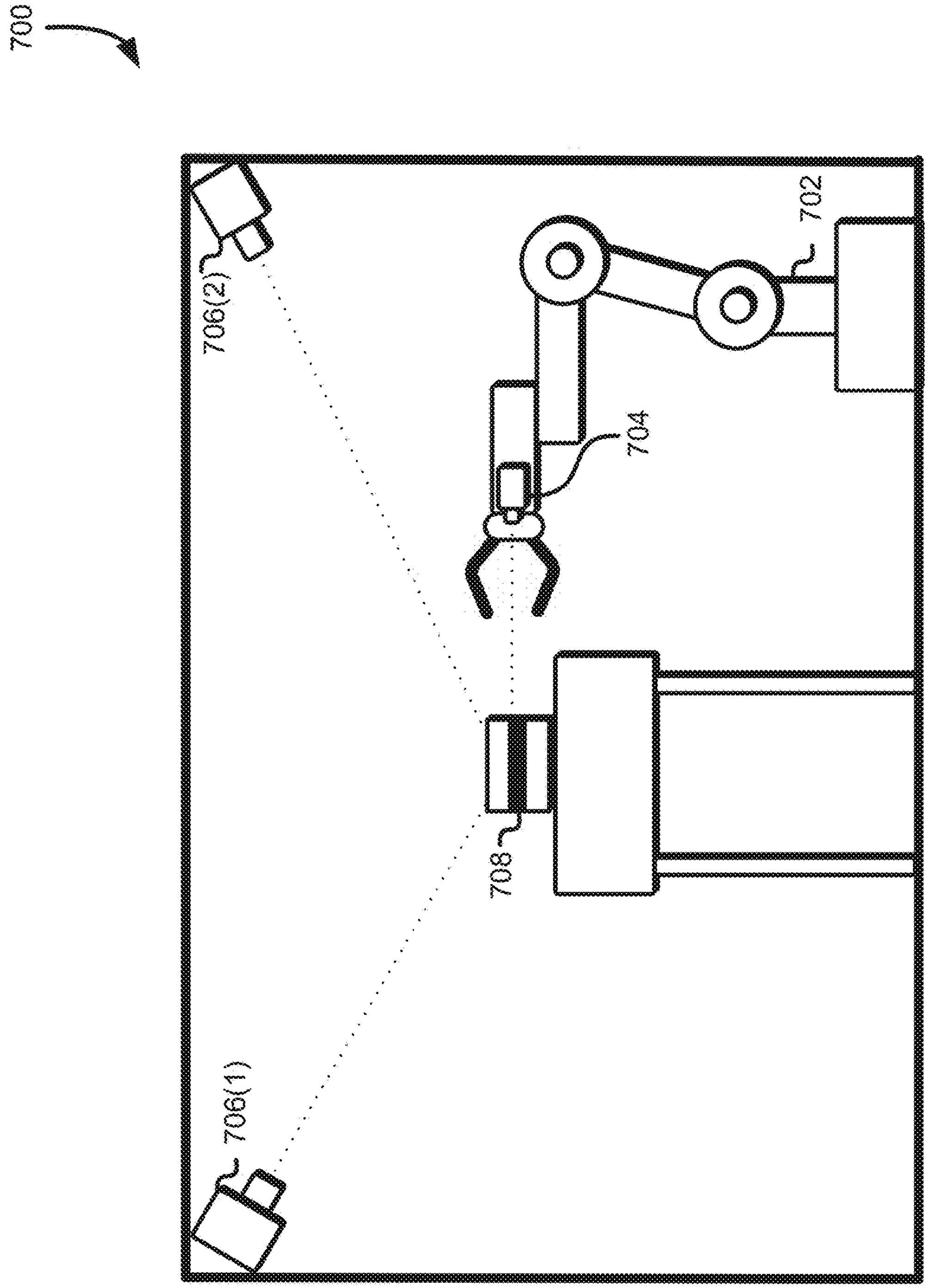
FIG. 7 illustrates a device using sensor data, according to at least one embodiment.

At block 402, the one or more entities may wait for a trigger associated with one or more steps to be performed by a device (e.g., robotic arm 152, automobile 154, device 156 illustrated in FIG. 1, robotic arm 702 illustrated in FIG. 7). If the trigger is identified in block 404, process 400 may move to block 406. If the trigger is not identified in block 404, processor 400 may move to block 402. Numerous examples of the trigger are described in conjunction with FIG. 1-2.

At block 406, the one or more entities may transmit a request to generate a set of images. The request may include one or more control signals to cause one or more sensors (e.g., sensor 120 illustrated in FIG. 1, sensor 210 illustrated in FIG. 2) to capture the set of images. The set of images may depict one or more objects in various viewpoints. One example of various viewpoints include an environment with a first camera with a front viewpoint and a second camera with a bottom viewpoint taking photos at different times, possibly due to variations in their configurations or control mechanisms. This may cause robots to simultaneously view and compare these different perspectives of the same object or objects. By integrating the information from multiple viewpoints, robots can make more informed decisions, such as securely grasping a box by coordinating front and bottom supports to ensure stability and safety. In some examples, other sensor data generated by various sensors described in conjunction with FIG. 1 can be generated singly or in combination with the set of images, where the sensor data is to be used by other processors.

At block 408, the one or more entities may generate synthetic data to be sent to a transmitter (e.g., transceivers 130 illustrated in FIG. 1, transmitter 230 illustrated in FIG. 2) such that the synthetic data is sent to the transmitter while the transmitter performs resynchronization of the link between the transmitter and a receiver. Various examples of synthetic data are described in conjunction with FIG. 1-2.

At block 410, the one or more entities may transmit the synthetic data to the transmitter while the set of images is captured by the one or more sensors. If the set of images is received 412, process 400 may move to block 414. If the set of images is not received 412, process 400 may move to block 414.

At block 414, the one or more entities may transmit the set of images to the transmitter. As a result, the transmitter sends the set of images via the resynchronized link between the transmitter and a receiver (e.g., transceivers 130 illustrated in FIG. 1, receiver 240 illustrated in FIG. 2). After receiving the set of images, the receiver sends the set of images to a host processor (e.g., host processor 110 illustrated in FIG. 1, second processor 250 illustrated in FIG. 2). Note that one or more of the operations performed in blocks 402-414 may be performed in various orders and combinations, including in parallel.

Figure 5:
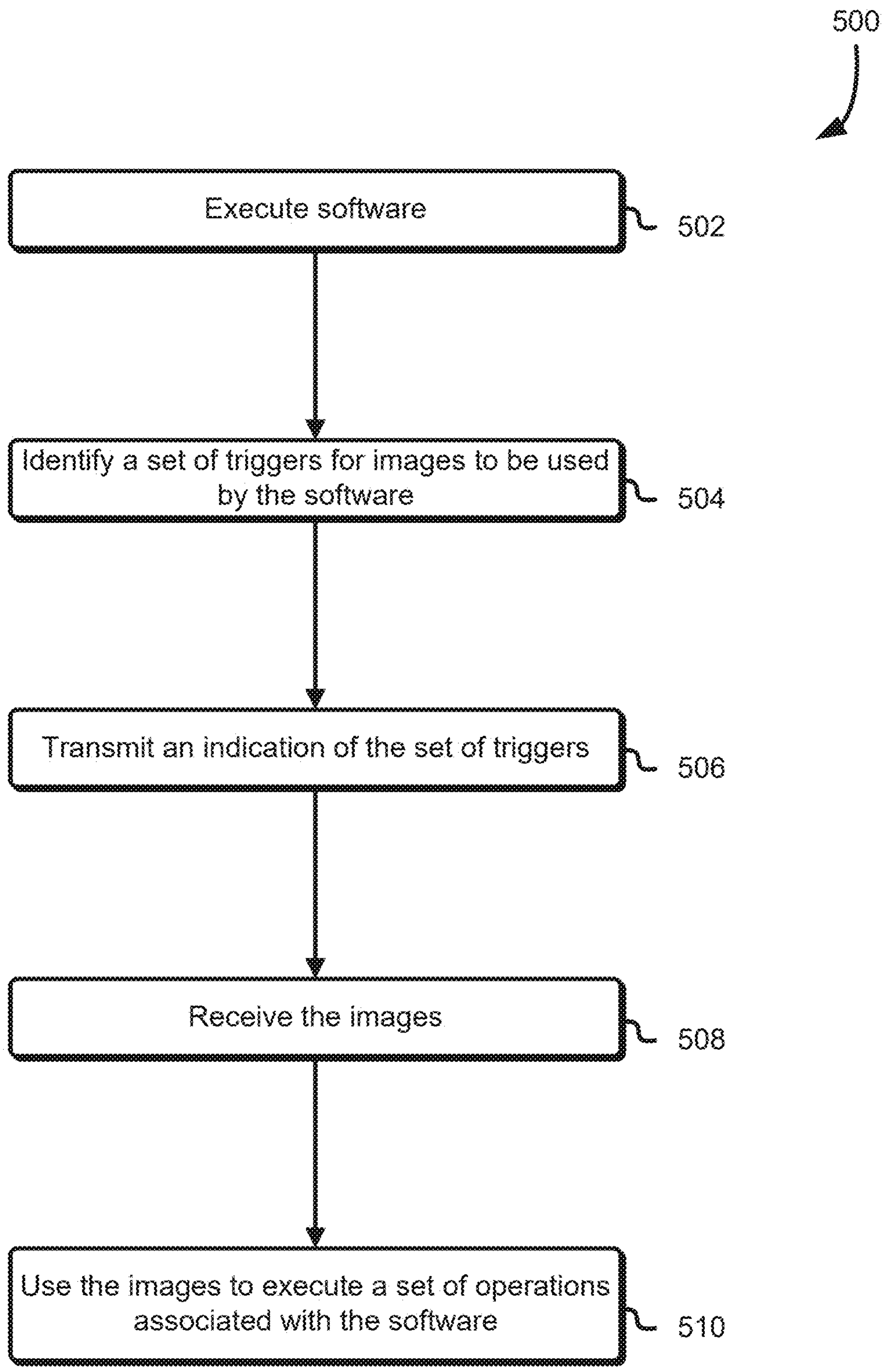
FIG. 5 illustrates a process to identify a trigger for sensor data, according to at least one embodiment.

FIG. 5 illustrates an example process to identify a trigger for sensor data, according to at least one embodiment. Although process 500 is depicted as a series of steps or operations, it will be appreciated that at least one embodiment of process 500 includes altered or reordered steps or operations, or omits certain steps or operations, except where explicitly noted or logically required, such as when an output of one step or operation is used as input for another. One or more entities described in conjunction with FIGS. 1-3 and 7-8, singly or in any combination, can perform each block of process 500. For example, the one or more entities may include computer system 102, host processor 110, image processor 112, controllers 114, sensor 120, transceivers 130, storage 140, processor 150, data generator for transceivers 152, robotic arm 152, automobile 154, and/or device 156 illustrated in FIG. 1. In some examples, the one or more entities may include sensor 210, first processor 220, data generator 222, transmitter 230, receiver 240, and/or second processor 250 illustrated in FIG. 2. In other examples, the one or more entities may include processor 310 and/or transmitter 320 illustrated in FIG. 3. The one or more entities may further include, for example, one or more of hardware and/or software described in conjunction with FIG. 1.

Various functions can be carried out by a processor executing instructions stored in memory (e.g., computer readable, machine readable) to perform process 500. For example, the instructions may include a computer program persistently stored on magnetic, optical, or flash media. Also, process 500 may be implemented as computer-usable instructions (e.g., macro instruction, micro-instruction) stored on computer storage media or provided by a standalone application, a service or hosted service (standalone or in combination with another hosted service).

At block 502, the one or more entities may execute software to control a device (e.g., robotic arm 152, automobile 154, device 156 illustrated in FIG. 1, robotic arm 702 illustrated in FIG. 7), where software may refer to various examples described in conjunction with FIG. 1. In some examples, one or more host processors (e.g., host processor 110 illustrated in FIG. 1, second processor 250 illustrated in FIG. 2) may execute the software.

At block 504, the one or more entities may identify a set of triggers for images to be used while the software is being performed. Some example triggers may include, in a distribution center context, packages that have arrived on a conveyor belt, packages that change position, completion of a previous task, detection of obstructions or errors, scheduled intervals, manual override (e.g., user input), processing a high priority package, etc. In some examples, other sensor data generated by various sensors described in conjunction with FIG. 1 can be generated singly or in combination with the images, where the sensor data is to be used by other processors (e.g., the one or more host processors).

At block 506, the one or more entities may transmit to one or more processors (e.g., processor 150 illustrated in FIG. 1, first processor 220 illustrated in FIG. 2, processor 310 illustrated in FIG. 3), an indication that the set of triggers is detected.

At block 508, the one or more entities may receive the images that are captured as a result of the set of triggers. The images may refer to the set of images received by performing at least one block of process 400 described in conjunction with FIG. 4. The images can be received as a result of generating fabricated data that are described in conjunction with FIGS. 1-4 and 6-7. In some examples, the fabricated data contains less pixel data compared to the images.

At block 510, the one or more entities may use the images to execute a set of operations associated with the software. For example, the one or more entities may generate one or more control signals using the images to cause the device to perform the set of operations. In some examples, one or more neural networks described herein can be used to generate the one or more control signals. In other examples, other algorithms can be used to make one or more determinations of the next steps to be performed by the device based on the images. The set of operations may include, in the distribution center context, package sorting, orientation adjustment, error corrections, quality inspection, package scanning, loading and unloading, or any other picking and placing operations. Note that one or more of the operations performed in blocks 502-510 may be performed in various orders and combinations, including in parallel.

Figure 6:
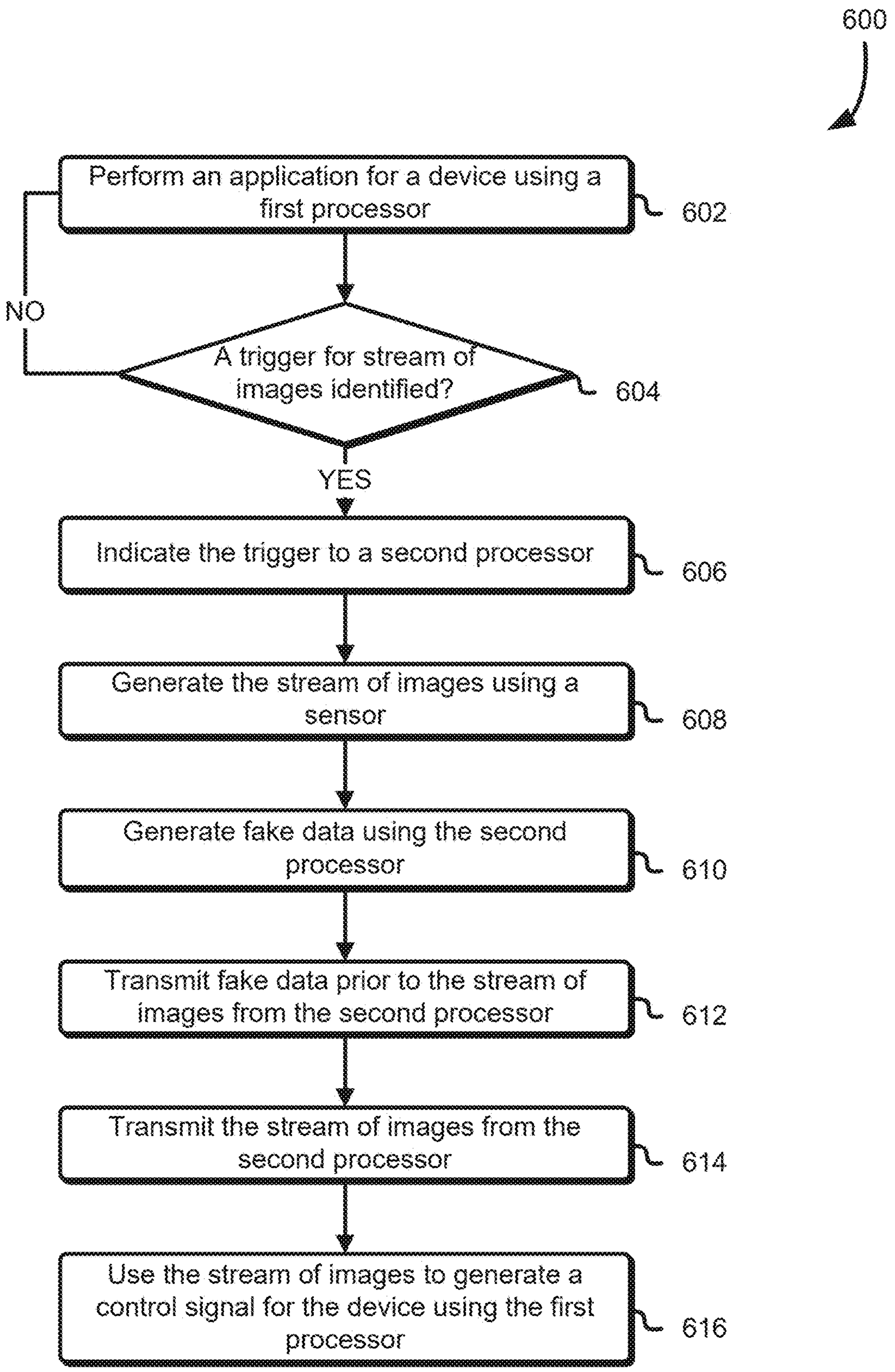
FIG. 6 illustrates a process to control devices using sensor data, according to at least one embodiment.

FIG. 6 illustrates an example process to control devices using sensor data, according to at least one embodiment. Although process 600 is depicted as a series of steps or operations, it will be appreciated that at least one embodiment of process 600 includes altered or reordered steps or operations, or omits certain steps or operations, except where explicitly noted or logically required, such as when an output of one step or operation is used as input for another. One or more entities described in conjunction with FIGS. 1-3 and 7-8, singly or in any combination, can perform each block of process 600. For example, the one or more entities may include computer system 102, host processor 110, image processor 112, controllers 114, sensor 120, transceivers 130, storage 140, processor 150, data generator for transceivers 152, robotic arm 152, automobile 154, and/or device 156 illustrated in FIG. 1. In some examples, the one or more entities may include sensor 210, first processor 220, data generator 222, transmitter 230, receiver 240, and/or second processor 250 illustrated in FIG. 2. In other examples, the one or more entities may include processor 310 and/or transmitter 320 illustrated in FIG. 3. The one or more entities may further include, for example, one or more of hardware, and/or software described in conjunction with FIG. 1.

Various functions can be carried out by a processor executing instructions stored in memory (e.g., computer readable, machine readable) to perform process 600. For example, the instructions may include a computer program persistently stored on magnetic, optical, or flash media. Also, process 600 may be implemented as computer-usable instructions (e.g., macro instruction, micro-instruction) stored on computer storage media or provided by a standalone application, a service or hosted service (standalone or in combination with another hosted service).

At block 602, the one or more entities may perform an application for a device (e.g., robotic arm 152, automobile 154, device 156 illustrated in FIG. 1, robotic arm 702 illustrated in FIG. 7) using a first processor (e.g., host processor 110 illustrated in FIG. 1, second processor 250 illustrated in FIG. 2). In some examples, the application may be part of software described in conjunction with FIG. 5. The application is to cause the device to perform certain steps. Various examples of the application are described in conjunction with FIG. 1. If one or more triggers for a stream of images are identified 604, process 600 may move to block 606. If the one or more triggers for a stream of images are not identified 604, process 600 may move to block 602. Various examples of the one or more triggers are described in conjunction with FIG. 1-2. In some examples, the trigger is also for other sensor data generated by various sensors described in conjunction with FIG. 1, where the sensor data is to be used by the first processor.

At block 606, the one or more entities may indicate the trigger to a second processor (e.g., processor 150 illustrated in FIG. 1, first processor 220 illustrated in FIG. 2, processor 310 illustrated in FIG. 3). At block 608, the one or more entities may generate the stream of images using one or more sensors (e.g., sensor 120 illustrated in FIG. 1, sensor 210 illustrated in FIG. 2). The one or more sensors may receive one or more control signals for the first processor and/or the second processor.

At block 610, the one or more entities may generate fake data using the second processor. The generation can be based on an amount of time to wake up a transmitter. The generation can also be based on configuration information received from the first processor that includes the amount of time. The generation can be based on an amount of time to capture the stream of images and send it to the second processor.

At block 612, the one or more entities may transmit the fake data prior to transmitting the stream of images from the second processor. The one or more entities may include one or more multiplexers that cause the fake data to be transmitted until the second processor receives the stream of images.

At block 614, the one or more entities may transmit the stream of images from the second processor to a transmitter (e.g., transceivers 130 illustrated in FIG. 1, transmitter 230 illustrated in FIG. 2, transmitter 320 illustrated in FIG. 3). As a result, the transmitter may transmit the stream of images (but not the fake data) to the receiver (e.g., transceivers 130 illustrated in FIG. 1, receiver 240 illustrated in FIG. 2) that is connected to the first processor.

At block 616, the one or more entities may use the stream of images to generate one or more control signals for the device using the first processor. In some examples, the one or more entities may use one or more neural networks to identify one or more steps that the device performs based on the stream of images. The one or more entities may use other algorithms to identify the steps using the stream of images. Specifically, the one or more entities may adjust the device's path to avoid obstacles to ensure that the device navigates safely around unexpected barriers based on sensor data that is fed by the first processor using the second processor. The one or more entities may cause the device to follow a pre-determined route. The one or more entities may cause the device to sort or pick up objects. Note that one or more of the operations performed in blocks 602-616 may be performed in various orders and combinations, including in parallel.

FIG. 7 illustrates an example of a device using sensor data, according to at least one embodiment. In some examples, environment 700 can be a distribution center that includes a robotic arm 702. Robotic arm 702 may include articulated joints and fine-tuned servos that move swiftly and accurately based on control signals generated by a host processor (e.g., host processor 110 illustrated in FIG. 1, second processor 250 illustrated in FIG. 2).

Environment 700 may include sensors such as camera 706(1), camera 706(2), and camera 704. Some sensors such as camera 706(1) and camera 706(2) can be mounted in different locations to capture objects such as object 708 in different viewpoints. Additionally, robotic arm 702 can also include cameras such as camera 704 to provide a more comprehensive view of objects to be moved in the distribution center. In some examples, sensors such as camera 706(1), camera 706(2), and camera 704 can be part of sensor 120 illustrated in FIG. 1 or sensor 210 illustrated in FIG. 2.

In some examples, the sensors can send sensor data (e.g., frames) to one or more processors (e.g., processor 150 illustrated in FIG. 1, first processor 220 illustrated in FIG. 2, processor 310 illustrated in FIG. 3). In response, the one or more processors may send the sensor data instead of synthetic data that have sent prior to sending the sensor data to wake up transmitters (e.g., transceivers 130 illustrated in FIG. 1, transmitter 230 illustrated in FIG. 2, transmitter 320 illustrated in FIG. 3) such that none of the sensor data is ignored or not acknowledged while the transmitter resynchronizes one or more links between the transmitter and the receiver (e.g., transceivers 130 illustrated in FIG. 1, GMSL deserializer) that receives sensor data on behalf of the host processor.

In other examples, the host processor can employ one or more image processing algorithms, such as, for example, neural networks to analyze the sensor data. This may include identifying each object's dimensions, weight, and destination. By utilizing the sensor data from different viewpoints, the processor may generate control signals specifically tailored to the requirements of each object (e.g., object 708). The processor may send the control signals to robotic arm 702 to enable it to perform its tasks. In one example, the tasks can be caused by a trigger (e.g., object being identified by one of camera 706(1), camera 706(2), and camera 704 or other sensors not explicitly illustrated in FIG. 7) that was identified by the host processor. Tasks may include picking up objects (e.g., object 708) from conveyor belts and placing them onto designated sorting areas or into specific bins based on the sensor data.

Figure 8:
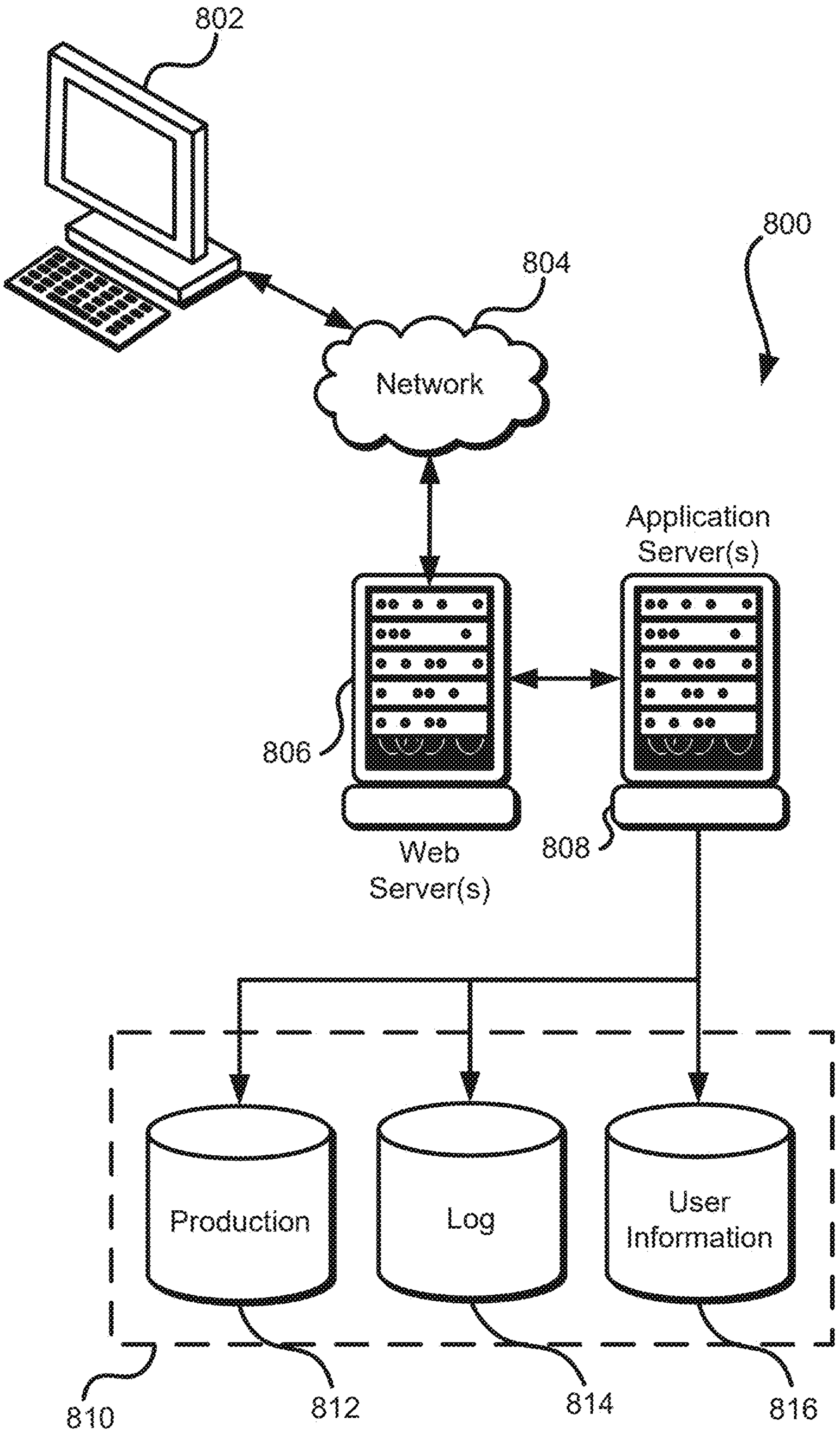
FIG. 8 illustrates a system in which various embodiments can be implemented.

FIG. 8 illustrates aspects of system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

At least one embodiment of the disclosure can be described in view of the following clauses:

1. A computer-implemented method, comprising:

in response to a trigger event associated with a robot, obtain from one or more first processors of the robot, a request for a plurality of images associated with the trigger event;

generating one or more control signals to cause one or more sensor devices to generate the plurality of images based, at least in part, on the request;

identifying an amount of time to take to resynchronize a link between a transmitter and a receiver;

generating synthetic information based, at least in part, on the identification;

causing the transmitter to resynchronize the link to provide the plurality of images to the one or more first processors as a result of providing, to the transmitter, synthetic information prior to providing the plurality of images; and providing the plurality of images to the one or more first processors using the transmitter and the receiver.

2. The computer-implemented method of claim 1, wherein the amount of synthetic information to be generated is based, at least in part, on the amount of time to take to resynchronize the link between the transmitter and the receiver.

3. The computer-implemented method of claim 1, further comprising:

causing the one or more first processors to generate one or more signals to control one or more portions of the robot in response to the trigger event.

4. The computer-implemented method of claim 1, wherein the transmitter is a gigabit multimedia serial link (GMSL) serializer.

5. A system, comprising:

one or more processors;

memory that stores computer-executable instructions that, if executed, cause the one or more processors to:

receive a trigger that requests one or more images;

cause one or more sensors to generate the one or more images;

generate fabricated data based, at least in part, on amount of time to resynchronize a transmitter to transmit the one or more images to one or more host processors; and transmit the fabricated data to the transmitter before the one or more images are transmitted to the transmitter.

6. The system of claim 5, wherein the computer-executable instructions further comprise computer-executable instructions that, if executed by the one or more processors, cause the system to:

determine that the one or more images are received from the one or more sensors; and cause the one or more images to be transmitted instead of the fabricated data based, at least in part, on the determination.

7. The system of claim 5, wherein the one or more host processors use one or more neural networks to identify one or more steps for a robot in response to the trigger based, at least in part, on the one or more images.

8. The system of claim 5, wherein the transmitter deactivates after transmitting the one or more images to the one or more host processors of the system.

9. The system of claim 5, wherein the amount of time is specified in configuration information received from the one or more host processors.

10. The system of claim 5, wherein the fabricated data comprises a smaller number of pixels than the one or more images.

11. The system of claim 5, wherein the one or more processors comprise a field programmable gate array (FPGA).

12. The system of claim 5, wherein the transmitter comprises one or more gigabit multimedia serial link (GMSL) serializers.

13. A non-transitory computer-readable storage medium storing thereon executable instructions that, as a result of being executed by one or more processors of a computer system, cause the computer system to at least:

identity an indication of a trigger that is associated with one or more frames;

cause a set of sensors to generate one or more frames in response to the trigger;

generate additional data for the one or more frames based, at least in part, on re-synchronization of a transceiver that provides the additional data to one or more additional processors; and transmit the additional data to the transceiver in advance of providing the one or more frames.

14. The non-transitory computer-readable storage medium of claim 13, wherein the instructions further comprise instructions that, as a result of being executed by the one or more processors, cause the computer system to receive, from the set of sensors, indication that information is captured to generate the one or more frames.

15. The non-transitory computer-readable storage medium of claim 13, wherein one or more frames depict an object from different viewpoints.

16. The non-transitory computer-readable storage medium of claim 13, wherein the additional data comprises a smaller number of lines than the one or more frames.

17. The non-transitory computer-readable storage medium of claim 13, wherein the transceiver is deactivated after providing the one or more frames to the one or more additional processors.

18. The non-transitory computer-readable storage medium of claim 13, wherein the one or more additional processors are associated with an autonomous vehicle.

19. The non-transitory computer-readable storage medium of claim 13, wherein the one or more processors comprise an application-specific integrated circuit (ASIC).

20. The non-transitory computer-readable storage medium of claim 13, wherein the transceiver comprises a flat panel display (FPD)-Link serializer.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:

detect a trigger event associated with one or more first processors of a robot, the trigger event associated with a request for a plurality of images;

generating one or more control signals to cause one or more sensor devices to generate the plurality of images based, at least in part, on the request;

identifying an amount of time to take to resynchronize a link between a transmitter and a receiver;

generating synthetic information based, at least in part, on the identification, wherein the synthetic information comprises a smaller number of pixels than the plurality of images;

providing the synthetic information to the transmitter to cause the transmitter to resynchronize the link to provide the plurality of images to the one or more first processors as a result of providing, to the transmitter, synthetic information prior to providing the plurality of images; and providing the plurality of images to the one or more first processors using the transmitter and the receiver.

2. The computer-implemented method of claim 1, wherein the amount of synthetic information to be generated is based, at least in part, on the amount of time to take to resynchronize the link between the transmitter and the receiver.

3. The computer-implemented method of claim 1, further comprising:

causing the one or more first processors to generate one or more signals to control one or more portions of the robot in response to the trigger event.

4. The computer-implemented method of claim 1, wherein the transmitter is a gigabit multimedia serial link (GMSL) serializer.

5. A system, comprising:

one or more processors;

memory that stores computer-executable instructions that, if executed, cause the one or more processors to:

receive a trigger that requests one or more images;

cause one or more sensors to generate the one or more images;

generate fabricated data based, at least in part, on amount of time to resynchronize a transmitter to transmit the one or more images to one or more host processors, wherein the fabricated data comprises a smaller number of pixels than the one or more images; and transmit the fabricated data to the transmitter before the one or more images are transmitted to the transmitter.

6. The system of claim 5, wherein the computer-executable instructions further comprise computer-executable instructions that, if executed by the one or more processors, cause the system to:

determine that the one or more images are received from the one or more sensors; and cause the one or more images to be transmitted instead of the fabricated data based, at least in part, on the determination.

7. The system of claim 5, wherein the one or more host processors use one or more neural networks to identify one or more steps for a robot in response to the trigger based, at least in part, on the one or more images.

8. The system of claim 5, wherein the transmitter deactivates after transmitting the one or more images to the one or more host processors of the system.

9. The system of claim 5, wherein the amount of time is specified in configuration information received from the one or more host processors.

10. The system of claim 5, wherein the one or more processors comprise a field programmable gate array (FPGA).

11. The system of claim 5, wherein the transmitter comprises one or more gigabit multimedia serial link (GMSL) serializers.

12. A non-transitory computer-readable storage medium storing thereon executable instructions that, as a result of being executed by one or more processors of a computer system, cause the computer system to at least:

identity an indication of a trigger that is associated with one or more frames;

cause a set of sensors to generate the one or more frames in response to the trigger;

generate additional data for the one or more frames based, at least in part, on re-synchronization of a transceiver that provides the additional data to one or more additional processors, wherein the additional data comprises a smaller number of lines than the one or more frames; and transmit the additional data to the transceiver in advance of providing the one or more frames.

13. The non-transitory computer-readable storage medium of claim 12, wherein the instructions further comprise instructions that, as a result of being executed by the one or more processors, cause the computer system to receive, from the set of sensors, indication that information is captured to generate the one or more frames.

14. The non-transitory computer-readable storage medium of claim 12, wherein one or more frames depict an object from different viewpoints.

15. The non-transitory computer-readable storage medium of claim 12, wherein the transceiver is deactivated after providing the one or more frames to the one or more additional processors.

16. The non-transitory computer-readable storage medium of claim 12, wherein the one or more additional processors are associated with an autonomous vehicle.

17. The non-transitory computer-readable storage medium of claim 12, wherein the one or more processors comprise an application-specific integrated circuit (ASIC).

18. The non-transitory computer-readable storage medium of claim 12, wherein the transceiver comprises a flat panel display (FPD)-Link serializer.

* * * * *